(12) United States Patent
He et al.

(10) Patent No.: US 10,577,676 B2
(45) Date of Patent: Mar. 3, 2020

(54) PROCESS FOR RECYCLING CHROMIUM FROM WASTE WATER CONTAINING HEXAVALENT CHROMIUM

(71) Applicant: Hunan Yonker Environmental Protection Research Institute Co., LTD, Changsha (CN)

(72) Inventors: Qianfeng He, Changsha (CN); Leshan Song, Changsha (CN); Haiyan Yan, Changsha (CN); Xiongjie Que, Changsha (CN); Bao Liu, Changsha (CN); Qunhuan Cai, Changsha (CN); Jie Liu, Changsha (CN); Yongge Yao, Changsha (CN); Biyu Sun, Changsha (CN)

(73) Assignee: HUNAN YONKER ENVIRONMENTAL PROTECTION RESEARCH INSTITUTE CO., LTD, Changsha (CN)

( * ) Notice: Subject to any disclaimer, the term of this patent is extended or adjusted under 35 U.S.C. 154(b) by 160 days.

(21) Appl. No.: 15/513,940

(22) PCT Filed: Jun. 25, 2015

(86) PCT No.: PCT/CN2015/082286
§ 371 (c)(1),
(2) Date: Mar. 23, 2017

(87) PCT Pub. No.: WO2016/150022
PCT Pub. Date: Sep. 29, 2016

(65) Prior Publication Data
US 2017/0268080 A1    Sep. 21, 2017

(30) Foreign Application Priority Data
Mar. 25, 2015 (CN) .......................... 2015 1 0133414

(51) Int. Cl.
| | | |
|---|---|---|
| C22B 34/32 | (2006.01) |
| C22B 3/20 | (2006.01) |
| C22B 3/26 | (2006.01) |
| C22B 3/32 | (2006.01) |
| C22B 3/28 | (2006.01) |
| C22B 7/00 | (2006.01) |
| C01G 37/08 | (2006.01) |
| C02F 1/26 | (2006.01) |
| C02F 101/22 | (2006.01) |

(52) U.S. Cl.
CPC .............. *C22B 34/32* (2013.01); *C01G 37/08* (2013.01); *C02F 1/26* (2013.01); *C22B 3/0004* (2013.01); *C22B 3/0009* (2013.01); *C22B 3/0012* (2013.01); *C22B 3/0021* (2013.01); *C22B 3/0024* (2013.01); *C22B 7/006* (2013.01); *C02F 2101/22* (2013.01); *Y02P 10/234* (2015.11)

(58) Field of Classification Search
CPC ... C22B 3/0005; C22B 3/0024; C22B 3/0012; C22B 3/0009; C22B 3/0021; C22B 7/006; C22B 34/32; C22B 3/0006; C02F 1/26; C01G 37/08
See application file for complete search history.

(56) References Cited

U.S. PATENT DOCUMENTS

| 3,856,916 A | * | 12/1974 | Lefrancois | ............. | C01G 37/08 |
| | | | | | 423/54 |
| 4,528,175 A | * | 7/1985 | Walther | .................. | C01B 11/18 |
| | | | | | 423/305 |
| 4,956,154 A | * | 9/1990 | Magdics | ................ | C01G 3/003 |
| | | | | | 210/634 |

FOREIGN PATENT DOCUMENTS

| CN | 102503003 | * | 6/2012 |
| CN | 102531139 A | | 7/2012 |
| CN | 102618726 | * | 8/2012 |
| CN | 102965455 | * | 3/2013 |
| CN | 104046786 A | | 9/2014 |
| CN | 104609529 A | * | 5/2015 |
| CN | 104959369 | * | 10/2015 |

OTHER PUBLICATIONS

Cui Yingtao et al. CN 104609529 A abstract. May 13 (Year: 2015).*
CN 102618726 Machine Translation (Year: 2012).*
CN 104959369 Machine Translation (Year: 2015).*
CN 102503003 Machine Translation (Year: 2012).*
CN 102965455 Machine Translation (Year: 2013).*
International Search Report issued for International Application No. PCT/CN2015/082286 dated Dec. 31, 2015.

* cited by examiner (Continued)

*Primary Examiner* — Tima M. McGuthry-Banks
(74) *Attorney, Agent, or Firm* — Mauriel Kapouytian Woods LLP; James Woods

(57) ABSTRACT

A process for recovering chromium from hexavalent chromium-containing wastewater comprises the following steps: (1) extracting hexavalent chromium in wastewater to an organic phase by using an extracting agent, and separating hexavalent chromium from a water phase, so as to acquire a hexavalent chromium-loaded organic phase; (2) reducing the hexavalent chromium-loaded organic phase by using an aqueous solution of an organic reducing agent, reducing hexavalent chromium into trivalent chromium, reversely extracting trivalent chromium into the water phase, and separating the organic phase from the water phase to acquire a solution of the trivalent chromium and a renewable organic phase, wherein the organic reducing agent is one or a mixture of alcohols, aldehydes and carboxylic acids having the carbon atom number ranging 1 to 3; and (3) performing solvent evaporation on the solution of trivalent chromium, catalyzing, and recovering the trivalent chromium.

6 Claims, No Drawings

PROCESS FOR RECYCLING CHROMIUM FROM WASTE WATER CONTAINING HEXAVALENT CHROMIUM

CROSS REFERENCE TO RELATED APPLICATIONS

This application is a national phase application of international application number PCT/CN2015/082286 filed on Jun. 25, 2015, which claims priority to Chinese application number 201510133414.6 filed on Mar. 25, 2015. The entire contents of these applications are hereby incorporated herein by reference.

FIELD OF THE INVENTION

The invention relates to a process for recycling chromium from waste water containing hexavalent chromium, and belongs to the field of sewage treatment.

BACKGROUND OF THE INVENTION

Chromium ($Cr^{6+}$) is needed or can be generated in industries such as chromium chemical, passivation of steel-making cold-rolled sheet, chemical plating and tanning, and a great deal of waste water containing chromium ($Cr^{6+}$) will be produced. Chromium is one of high toxic elements and can cause severe environment pollution when being directly discharged, grievous injury such as skin ulceration, inflammation of respiratory tract, anemia and neuritis can be resulted from human body contact or intake, and it also one of known carcinogen.

At present, harmless treatment of the waste water containing chromium ($Cr^{6+}$) mainly includes chemical reduction and sealed landfill after precipitation. If waste containing chromium ($Cr^{3+}$) residues are discharged or buried after being treated, environment pollution can still be caused in the long run. Documents show that the—waste water containing chromium ($Cr^{6+}$) can also be concentrated, extracted and recycled by using an extraction method. However, since extraction is performed under high acidity (the pH value being about 2) condition, and reverse extraction is performed under strong alkaline (the alkali concentration being greater than 1M) condition, so a great amount of agents will be consumed, and a great deal of high salinity waste water can be generated which is hard to treat. Moreover, the strip liquor is low in concentration, and produce high post-treatment expense in post-treatment.

SUMMARY OF THE INVENTION

The invention aims to solve technical problems that heavy addition of acid agents and alkali agents was used in the processes of extraction and reverse extraction, thereof to reduce consumption of the agents.

According to the technical scheme of the invention, a process for recycling chromium from waste water containing hexavalent chromium is provided, comprising the following steps: (1) extracting hexavalent chromium contained in waste water to an organic phase by using an extraction agent, and separating the organic phase from an aqueous phase to obtain the organic phase loaded with the hexavalent chromium;
(2) reducing the hexavalent chromium in organic phase to trivalent chromium by using an aqueous solution of an organic reducing agent, performing reverse extraction to feed the trivalent chromium into the aqueous phase, and performing separation of aqueous phase and organic phase to obtain a solution containing the trivalent chromium and an regenerated organic phase, wherein the organic reducing agent is selected at least one of alcohol, aldehyde and carboxylic acid with the number of carbon atom is 1-3; and
(3) performing solvent evaporation and then crystallization on the solution containing the trivalent chromium to recycle the trivalent chromium.

Furthermore, the regenerated organic phase in the step (2) is fed back to the step (1) to be used as the extraction agent for extraction of the hexavalent chromium in the waste water.

Furthermore, the evaporated solvent in the step (3) is recycled and is used for reducing the organic phase loaded with the hexavalent chromium in the step (2).

Furthermore, the extraction in the step (1) is a three-stage counter current extraction. Furthermore, the reverse extraction in the step (2) is a two-stage counter current reverse extraction.

Furthermore, the extraction agent in the step (1) is trialkylamin.

Furthermore, the organic reducing agent in the step (2) is ethanol.

The invention is based on the principle that extraction agents such as trialkylamin has very good extraction capability to $Cr^{6+}$ under an acidic condition with pH value of 0.5 to 2.5, while $Cr^{3+}$ can be barely extracted under the condition of such acidity. Firstly, $Cr^{6+}$ in the waste water containing $Cr^{6+}$ is extracted to the organic phase and then $Cr^{6+}$ in the organic phase is reduced to $Cr^{3+}$ by using the reducing agent, secondly, $Cr^{3+}$ is reversely extracted to the aqueous phase, and a $Cr^{3+}$ product can be generated after post-treatment. By virtue of extraction and concentration, the chromium in the waste water containing chromium can be separated and extracted, making the waste water to meet the emission standard, while $Cr^{6+}$ is concentrated in the separation process; then, by virtue of reduction and reverse extraction, $Cr^{6+}$ is reduced into $Cr^{3+}$ and $Cr^{3+}$ is fed back to the aqueous phase, making the extraction agent to regenerate and can be repeatedly used. After the chromium is further concentrated, a chemical product containing chromium can be generated after simple post-treatment. The reducing agent used can effectively reduce $Cr^{6+}$ under the acidic condition, and to simplify post-treatment of chromic salts and not to cause too high treatment cost, and not to generate high-salt waste water due to generation of new metallic ions or other salts, the reducing agent used in the invention is an organic reducing agent such as alcohol, aldehyde and carboxylic acid, and preferably, ethanol is taken as the reducing agent in consideration of factors such as reducibility, mutual solubility degree with water, and toxicity. Meanwhile, too long carbon chain of the organic reducing agent will lead to generation of a third phase, reduction failure and complex oxidation products in the extraction process, and thus the number of carbon atoms of the organic reducing agent is selected to be smaller than 3 to ensure effective reduction and separation of aqueous phase and organic phase.

In the invention, preparing a trialkylamin-organic phase solution such as a trialkylamin-kerosene solution containing 10-50 wt % of the extraction agent using the extraction agent such as trialkylamin under the acidic condition with the pH value of 0.5-2.5; adjusting the pH value of the waste water containing chromium to 1.5-2.5 by using 10-50 wt % of sulfuric acid; performing extraction on waste water containing chromium using multi-stage counter current extraction, wherein extraction agent refers to the trialkylamin-kerosene solution containing 10-50 wt % of the extraction agent, and the flow velocity ratio of aqueous phase to oil phase in extraction is (10-25):1 (that is, the waste water containing chromium is concentrated by 10-25 times); providing a sampling opening at extraction raffinate outlet, performing online sampling analysis by using a spectrophotometer according to the analysis method under Chinese national standards GB7467-1987, wherein, discharging the waste water if the standard is reached, feeding back the waste water to circulate if the standard is not reached, and reducing the flow velocity ratio of aqueous phase to oil phase; the organic phase loaded with the hexavalent chromium is used in the reverse extraction; dissolving the organic reducing agent in water, and performing reduction and reverse extraction on the organic phase loaded with the hexavalent chromium, wherein the flow velocity ratio of aqueous phase to oil phase in reverse extraction is (1:1)-(1:5), and reverse extraction is multi-stage counter current reverse extraction; performing post-treatment on the solution containing trivalent chromium to prepare chromic salts or chromium oxide or hydroxide; repeatedly using the regenerated organic phase as the extraction agent.

The invention has the beneficial effects that high-concentration strip liquor can be generated through reduction and reverse extraction, so that later production difficulty and cost of chromic salt are both greatly reduced; alcohol, aldehyde or carboxylic acid with the carbon atom number of 1-3 is selected as the organic reducing agent, an intermediate oxidation product can be miscible with water, no impurity is introduced, the final oxidation products are carbon dioxide and water, no new metallic salt is generated in the strip liquor, generation of chromic salt does not need separation from other salts, thus it is easy to get a relatively pure chromic salt, and generation of high-concentration salt waste water can be avoided.

DETAILED DESCRIPTION OF THE EMBODIMENTS

In the process provided by the embodiment, the waste water containing chromium is the one in a waste water collection pool of a chromic salt plant, and the content of the hexavalent chromium is 53 mg/L. The process comprises the following steps: preparing a trialkylamin-kerosene solution containing 30 wt % of the extraction agent by taking trialkylamin as an extraction agent and kerosene as a solvent; preparing dilute sulfuric acid containing 10 wt % of sulfuric acid from concentrated sulfuric acid, and adjusting the pH value of the waste water containing chromium to 1.0-2.0; adding the prepared 30 wt % trialkylamin-kerosene solution to the waste water containing chromium to extract the hexavalent chromium, wherein the flow velocity ratio of aqueous phase to oil phase is 15:1 (i.e., the waste water containing chromium is concentrated by 15 times) in extraction; performing three-stage counter current extraction, providing a sampling opening at the extraction raffinate outlet, and performing online sampling analysis by using a spectrophotometer according to the analysis method under Chinese national standards GB7467-1987, wherein the concentration of effluent chromium ($Cr^{6+}$) is less than 0.1 mg/L; performing reduction and reverse extraction on the obtained organic phase loaded with the hexavalent chromium using aqueous solution containing 50 wt % of ethanol which is prepared by industrial ethanol, wherein the flow velocity ratio of aqueous phase to oil phase is 1:5 in reverse extraction, wherein the reverse extraction is two-stage counter current reverse extraction; performing post-treatment on the trivalent chromium in the aqueous phase, evaporating and recycling excessive ethanol, concentrating and crystallizing the aqueous solution to obtain chromium sulfate product, and feeding back the regenerated organic phase as the extraction agent for repeated use.

The invention claimed is:

1. A process for recycling chromium from waste water containing hexavalent chromium, comprising the following steps:
   (1) adjusting the pH value of the waste water containing chromium to 1.0-2.0 by using 10-50 wt % of sulfuric acid,
   then extracting hexavalent chromium contained in waste water to a trialkylamine-kerosene solution containing 30 wt % of trialkylamine as an extraction agent and kerosene as a solvent, and separating the organic phase from an aqueous phase to obtain the organic phase loaded with the hexavalent chromium, wherein the flow velocity ratio of aqueous phase to organic phase in extraction is (10-25):1;
   (2) reducing the hexavalent chromium in organic phase to trivalent chromium by using an aqueous solution of an organic reducing agent, performing reverse extraction to feed the trivalent chromium into the aqueous phase, and performing separation of aqueous phase and organic phase to obtain a solution containing the trivalent chromium and a regenerated organic phase, wherein the organic reducing agent is ethanol, the aqueous solution contains 50 wt % of ethanol, and the flow velocity ratio of aqueous phase to organic phase in reverse extraction is (1:1)-(1:5); and
   (3) performing solvent evaporation and then crystallization on the solution containing the trivalent chromium to recycle the trivalent chromium.

2. The process according to claim 1, wherein the regenerated organic phase in the step (2) is fed back to the step (1) to be used as the extraction agent for extraction of the hexavalent chromium in the waste water.

3. The process according to claim 2, wherein the reverse extraction in the step (2) is a two-stage counter current reverse extraction.

4. The process according to claim 1, wherein the evaporated solvent in the step (3) is recycled and is used for reducing the organic phase loaded with the hexavalent chromium in the step (2).

5. The process according to claim 1, wherein the extraction in the step (1) is a three-stage counter current extraction.

6. The process according to claim 1, wherein the reverse extraction in the step (2) is a two-stage counter current reverse extraction.

\* \* \* \* \*